(12) United States Patent
Wuestefeld

(10) Patent No.: US 7,995,215 B2
(45) Date of Patent: Aug. 9, 2011

(54) PROCESS FOR MONITORING THE FUNCTIONING AND/OR ADJUSTMENT OF AN OPTOELECTRONIC SENSOR ARRANGEMENT, AS WELL AS AN OPTOELECTRONIC SENSOR ARRANGEMENT

(75) Inventor: Martin Wuestefeld, Sexau (DE)

(73) Assignee: Sick AG, Waldkirch (DE)

( * ) Notice: Subject to any disclaimer, the term of this patent is extended or adjusted under 35 U.S.C. 154(b) by 655 days.

(21) Appl. No.: 12/071,384

(22) Filed: Feb. 20, 2008

(65) Prior Publication Data

US 2008/0204722 A1    Aug. 28, 2008

(30) Foreign Application Priority Data

Feb. 22, 2007 (DE) .......................... 10 2007 009 244

(51) Int. Cl.
*G01N 21/00* (2006.01)
(52) U.S. Cl. ......................... 356/614; 356/3.1
(58) Field of Classification Search ................ 356/3, 614
See application file for complete search history.

(56) References Cited

U.S. PATENT DOCUMENTS 6,815,660 B2 * 11/2004 Henkel et al. .................. 250/221

FOREIGN PATENT DOCUMENTS

| DE | 195 44 632 A1 | 6/1997 |
|---|---|---|
| DE | 199 51 557 A1 | 5/2000 |
| DE | 199 34 870 C1 | 1/2001 |
| DE | 100 55 689 A1 | 5/2002 |
| DE | 299 24 385 U1 | 3/2003 |
| DE | 102 17 295 A1 | 11/2003 |
| DE | 10 2004 008 059 A1 | 9/2005 |
| DE | 20 2005 010 358 U1 | 10/2005 |
| EP | 0491 118 A3 | 6/1992 |
| EP | 0 520 247 A2 | 12/1992 |
| EP | 1 040 366 B1 | 10/2000 |
| GB | 2 274 369 A | 7/1994 |
| WO | 03/056526 A2 | 7/2003 |
| WO | 2005/124274 A2 | 12/2005 |

* cited by examiner

*Primary Examiner* — Tari Chowdhury
*Assistant Examiner* — Tara S Pajoohi
(74) *Attorney, Agent, or Firm* — The Nath Law Group; Derek Richmond; Robert T. Burns

(57) ABSTRACT

Monitoring the functioning and/or adjustment of an optoelectronic sensor arrangement (10) exhibiting at least two optical transmitters (S1, S2, S3), to each of which a laterally-resolving optical receiver is assigned, such that each of the optical transmitters (S1, S2, S3) and the corresponding optical receivers (E1, E2, E3) are so positioned relative to each other that a light ray (L1$a$, L2$a$, L3$a$) emitted from the optical transmitter (S1, S2, S3) can be detected by the corresponding optical receiver (E1, E2, E3) after being reflected by a boundary surface (F), which process involves the following steps:

a) detecting the current position-proportional reception values for each optical transmitter (S1, S2, S3) and corresponding optical receiver (E1, E2, E3), b) determining the current relative positions for the reception values of any two adjacent optical transmitters (S1, S2, S3), p0 c) comparing the current relative positions for the reception values with stored reference values.

10 Claims, 1 Drawing Sheet

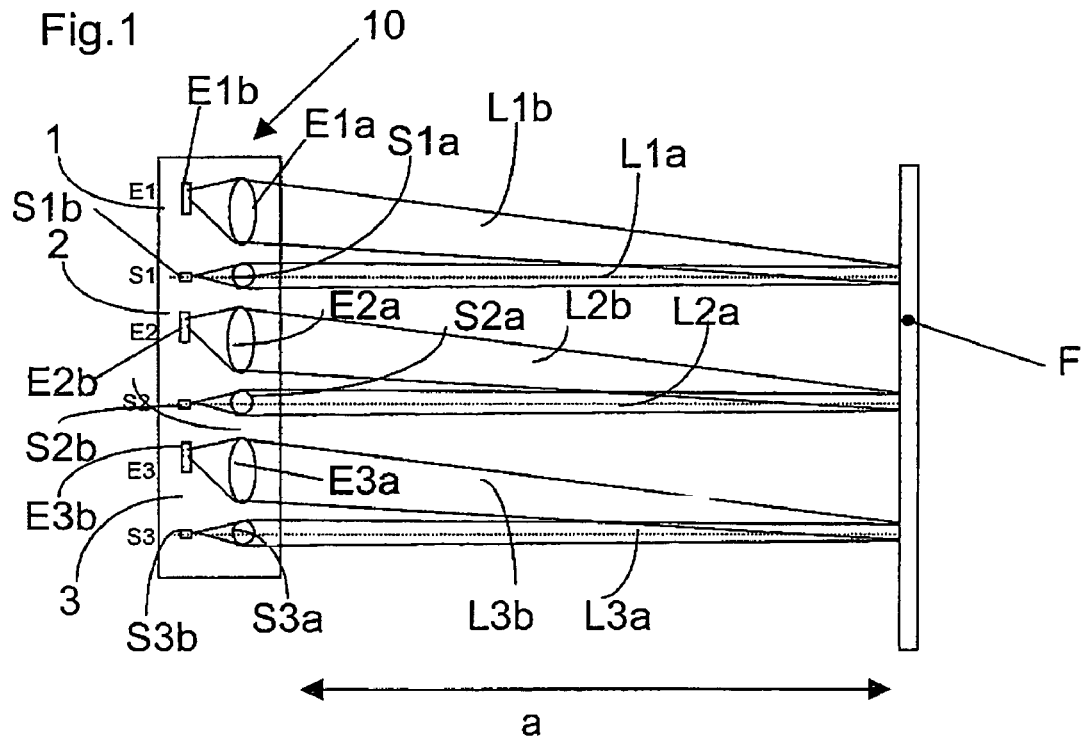
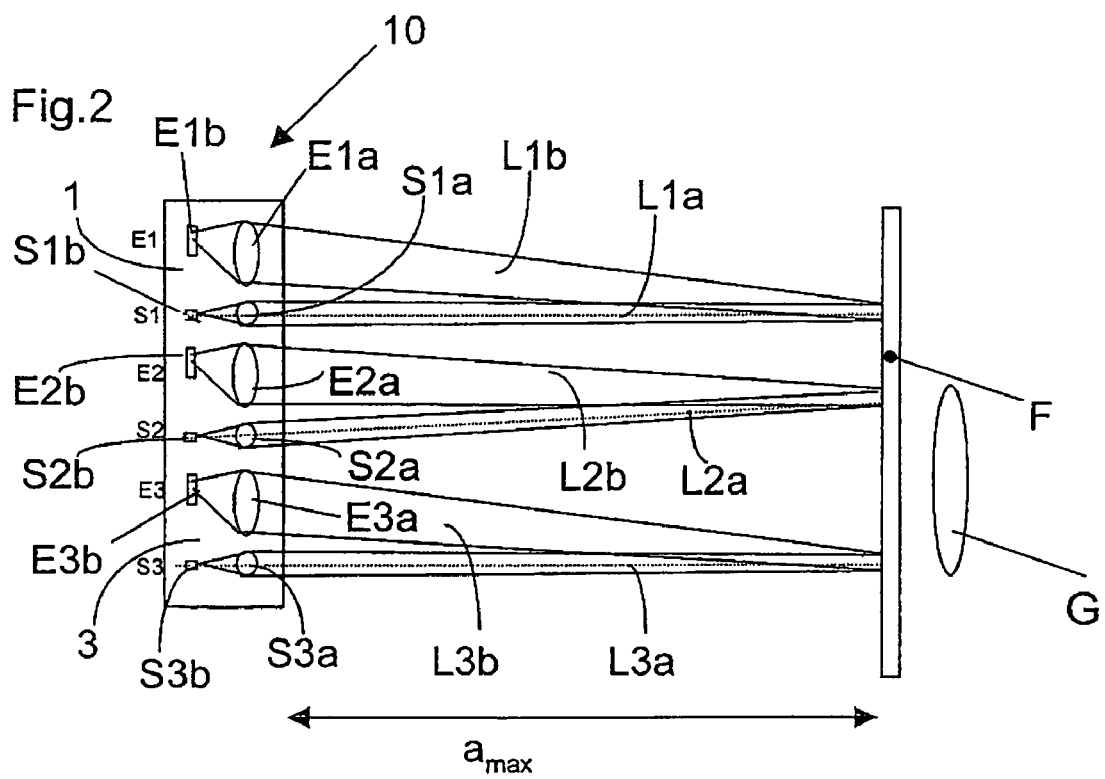

PROCESS FOR MONITORING THE FUNCTIONING AND/OR ADJUSTMENT OF AN OPTOELECTRONIC SENSOR ARRANGEMENT, AS WELL AS AN OPTOELECTRONIC SENSOR ARRANGEMENT

The present disclosure relates to a process for monitoring the functioning and/or adjustment of an optoelectronic sensor arrangement and a correspondingly equipped optoelectronic sensor arrangement.

Known to the prior art are sensor arrangements with at least two optical transmitters, to each of which is assigned an optical receiver designed as a laterally-resolving optical receiver, such that each optical transmitter and its corresponding optical receiver have a relative position that allows a light ray emitted by the optical transmitter to be detected by the corresponding optical receiver after being reflected by a boundary surface. This kind of optoelectronic sensor arrangement forms a scanning light grid by means of which a protected area can be monitored. Position-proportional reception values can be detected in the optical receivers, which means that the point of incidence on the laterally-resolving receiving element changes when there is a change in distance between the sensor arrangement and the boundary surface from which the light ray is reflected. This is known as the triangulation principle.

Known from DE 41 19 797 C2 is an optical security scanner, which has an optical receiver designed as a high-resolution analogue position-detector and which operates according to the triangulation principle. The optical security scanner described there can be employed to monitor the areas within a danger zone, in a multiple configuration positioned at the required distance.

DE 100 55 698 A1 discloses a triangulation light grid, in which each transmitter image is received on the detection surface of a line image sensor, where position data used for detecting an object that has penetrated the light grid are compared with the reference position data in order to examine whether the surveillance field is unoccupied.

The known triangulation light grids nonetheless have a disadvantage in that displacements between the optical transmitters and the optical receivers in the optoelectronic sensor arrangement (arising due to tolerance between the components or shifting during mounting or to vibrations or temperature dilation) are not ascertained and cannot be taken into account in the functioning of the optoelectronic arrangement. In principle, therefore, it may not be noticed that an optical transmitter/receiver has become displaced within the optoelectronic sensor configuration and that the resolution of the scanning light grid has decreased because there is an unmonitored area within the surveillance field.

A goal of the disclosed subject matter is to provide a process for monitoring the functioning and/or adjustment of an optoelectronic sensor arrangement with which displacements in the optimal relative position between the optical transmitters and the corresponding optical receivers can be identified. A further goal is to provide an optoelectronic sensor arrangement which allows the relative position between the components of the sensor arrangement to be monitored.

This goal is achieved with a process and apparatus for monitoring the functioning and/or adjustment of an optoelectronic sensor arrangement exhibiting the features an optoelectronic sensor arrangement exhibiting at least two optical transmitters, to each of which an optical receiver is assigned, such that each optical receiver is designed as a laterally-resolving optical receiver and such that each of the optical transmitters and the corresponding optical receivers are so positioned relative to each other that light beams emitted from the optical transmitter can be detected by the corresponding optical receiver after being reflected by a boundary surface. The process involves storing a maximum permitted distance between the optoelectronic sensor arrangement and the boundary surface, as determined by recording an object recorded at every defined distance from the optoelectronic sensor arrangement by at least two light beams, detecting the current position-proportional reception values for each optical transmitter and corresponding optical receiver, determining the current relative positions for the reception values of any two adjacent optical transmitters, and comparing the current relative positions for the reception values with stored reference values for the relative positions. In the process, a maximal admissible distance between the optoelectronic sensor arrangement and the boundary surface is determined and stored.

The disclosed process is based on the activities of detecting the current position-proportional reception values for each optical transmitter/receiver pair, determining the current relative positions for the reception values of any two adjacent optical transmitter/receiver pairs, and comparing those values with stored reference values for the relative positions of any two adjacent optical transmitter/receiver pairs. Thus, not only is the position-proportional reception value stored, it is also brought into relation with the corresponding position-proportional reception of the neighboring optical transmitter/receiver pair. Consequently it is possible to identify displacements between the different optical transmitter/receiver pairs or displacement of the optical transmitter or optical receiver within a given optical transmitter/receiver pair (as caused by tolerances between the structural components, torsion experienced by the optoelectronic arrangement during mounting, vibration of the optoelectronic arrangement, or temperature-specific expansion), since the result of such displacements is that the light ray emitted by an optical transmitter, after being reflected by a boundary surface, strikes a different position on the laterally-resolving optical receiver than the one intended and thus a deviation can be detected in the relative position between the two incident points of two adjacent, laterally resolving optical receivers.

The reference values for the relative positions are determined for a defined distance between optoelectronic sensor arrangement (or the optical transmitters) and the boundary area, preferably during manufacture of the optoelectronic sensor arrangement. This process involves the following steps. The position-proportional reception values for each optical transmitter and its corresponding optical receiver are detected for the defined distance between the optoelectronic sensor arrangement and the boundary surface and are stored as reference reception values. The relative positions for the reception values of any two adjacent optical transmitters, or optical transmitter/receiver pairs, are then determined and also stored as reference values for the relative positions. If the reference values for the relative position are determined during manufacture of the optoelectronic sensor arrangement, it can be assumed that the sensor arrangement was precisely adjusted during manufacture and that the optical transmitter and optical receiver were placed in the desired position, relative to each other, within the optoelectronic sensor arrangement. Torsions experienced by the optoelectronic sensor arrangement during mounting, or displacement of the optical transmitter and receiver, e.g., during transport, can thus be monitored as soon as the optoelectronic sensor arrangement is again put into operation and as soon as the current, position-proportional reception values and the corresponding relative positions of any two adjacent optical, transmitters have been compared with the stored reference values.

In the process, the reference values for the relative positions will ideally be determined for a plurality of different distances separating the optoelectronic sensor arrangement and the boundary surface, so that the appropriate distance between the optoelectronic sensor arrangement and the boundary surface is not established in advance for the later mounting.

Ideally a maximum permissible distance between the optical receivers and the boundary surface is determined and stored. For example, it can be determined during manufacture if all of the light rays emitted from the optical transmitters actually run parallel to each other or if one of the light rays runs an angle to the others. Such angled light rays cause the maximal resolution of the scanning light grid to change, inasmuch as an angle opens between light rays running at an angle to each other and an excessive distance separating the optoelectronic sensor arrangement and the boundary surface allows objects of a certain size to penetrate the intermediate space between the two light rays running at an oblique angle. It is possible to establish a maximal separating distance, for which objects of defined size or magnitude can be reliably identified, even in the case of obliquely running light rays. This magnitude will ideally be stored, so that it can be checked upon startup and at regular intervals during the monitoring performed in the course of normal surveillance, with the result that the reliability and security of the optoelectronic arrangement is increased.

It is especially preferred if a comparison of the current relative positions and the reference values for relative positions is performed before each startup and/or at regular intervals during operation, to thereby provide a continuous control of displacements that may arise between the given structural components.

The optoelectronic sensor arrangement exhibits at least two optical transmitters, to each of which an optical receiver is assigned. Each of the optical receivers is designed as a laterally-resolving optical receiver. Each of the optical transmitters and the corresponding optical receivers are so positioned relative to each other that a light ray emitted from the optical transmitter can be detected by the corresponding optical receiver after being reflected by a boundary surface. Each optical transmitter and its corresponding optical receiver form an optical transmitter/optical receiver pair. The optoelectronic sensor arrangement exhibits an evaluating and storage unit which is suited for detecting the current position-proportional reception values for each optical transmitter and corresponding optical receiver, and for determining the current relative positions for the reception values of any two adjacent optical transmitters, and for comparing the current relative positions for the reception values with the reference values for the relative positions stored in the evaluating and storage unit. This also permits the optoelectronic sensor arrangement to monitor the functioning and/or adjustment of the optoelectronic sensor arrangement.

In particular, the optical transmitters emit a collimated light ray, which ensures that a given optical receiver detects the light emitted by the corresponding optical transmitter.

It is particularly preferred if the optical transmitters transmit in the visible light spectrum. This simplifies the user's orientation and during operation alerts approaching persons to the protective area that is being monitored.

The laterally-resolving optical receivers are designed specifically in the form of a segmented diode or pixel array, in order to provide a particularly high lateral resolution.

In an advantageous configuration, a control unit is present which is suited to control the optical transmitters in such a way that each relative to the other emits a light ray that is staggered in time. As a result, an individual optical transmitter does not continuously emit light, but nonetheless ensures the reliable monitoring of the protected area.

The disclosed subject matter is next described in detail on the basis of the following figures. Shown are:

FIG. 1 a schematic depiction of an ideal scanning optoelectronic sensor arrangement FIG. 2 a schematic depiction of an actual scanning optoelectronic sensor arrangement.

FIG. 1 provides a schematic depiction of an ideal scanning optoelectronic sensor arrangement 10, with an initial optical transmitter S1, a second optical transmitter S2, and a third optical transmitter S3. Optical transmitters S1, S2, S3 each have a transmitting element S1$b$, S2$b$, S3$b$, which is positioned behind a lens system S1$a$, S2$a$, S3$a$. As a rule, this lens system S1$a$, S2$a$, S3$a$ is formed by a lens or lens configuration. Each of the optical transmitters S1, S2, S3 emits a light ray L1$a$, L2$a$, L3$a$ which strikes a boundary surface F and from there is reflected as a light ray L1$b$, L2$b$, L3$b$. The optical transmitters S1, S2, S3 are designed so as to emit a collimated light ray L1$a$, L2$a$, L3$a$. To this end, the transmitting element is, e.g., is a single point diode, a VCSEL (vertical cavity surface emitting laser), or a laser diode, with a corresponding collimating lens system.

An initial optical receiver E1 is assigned to the first optical transmitter S1, as is a second optical receiver E2 to the second optical transmitter S2, and a third optical receiver E3 to the third optical transmitter S3. Three optical transmitter/receiver pairs 1, 2, 3 are thus formed. The optical receivers E1, E2, E3 each detect the reflected light ray L1$b$, L2$b$, L3$b$, which arises after reflection by the boundary surface F of the light ray L1$a$, L2$a$, L3$a$ emitted by the corresponding optical transmitter S1, S2, S3. Optical receivers E1, E2, E3 each exhibit a laterally-resolving receiving element E1$b$, E2$b$, E3$b$, which may be formed by a segmented diode, a PSD (position sensitive device), or a pixel array. Positioned in front of the receiving elements E1$b$, E2$b$, E3$b$ is a corresponding lens system E1$a$, E2$a$, E3$a$, which as a rule consists of a lens or lens configuration.

The laterally-resolving receiving elements E1$b$, E2$b$, E3$b$ allow position-proportional reception values to be detected for each optical transmitter/receiver pair 1, 2, 3. These position-proportional reception values are dependent on the distance 'a' between the boundary surface F from which the emitted light ray L1$a$, L2$a$, L3$a$ is reflected and the optoelectronic sensor arrangement 10. The point of incidence of the reflected light ray L1$b$, L2$b$, L3$b$ on the laterally-resolving receiving element E1$b$, E2$b$, E3$b$ will vary in dependence on the distance 'a' between the optoelectronic arrangement 10 and the boundary surface F.

The ideal sensor arrangement 10 corresponds to, e.g., its condition at the time of manufacture, when the optical transmitter S1, S2, S3 and the optical receivers E1, E2, E3, with their corresponding components, can be positioned in the desired relative positions within a housing for the sensor arrangement 10 and can be optimally adjusted. To make it possible to examine whether this arrangement of components in the sensor configuration 10 is maintained after transport or after mounting of the sensor configuration 10, the position-proportional reception values for each optical transmitter/receiver pair 1, 2, 3 are detected for various separating distances 'a' and are stored. From these position-proportional reception values the relative positions for the position-proportional reception values of any two adjacent optical transmitter/receiver pairs are determined and stored (i.e., in the present case, the relative positions for the position-proportional reception values of transmitter/receiver pairs 1, 2 and the relative positions for the position-proportional reception values of transmitter/receiver pairs 2, 3). If the sensor arrangement 10 was transported and mounted, the current position-proportional reception values are detected and the relative positions for the position-proportional reception values of adjacent optical transmitter/receiver pairs 1, 2 or 2, 3 are determined and compared with the stored reference values for the relative positions.

The sensor arrangement 10 exhibits an evaluating and control unit which detects, stores, and processes the position-proportional reception values. Furthermore, the evaluating and control unit is capable of piloting the optical transmitters S1, S2, S3 in such a way that only one of the optical transmitters S1, S2, S3 in each case emits a light ray. In particular, specific time intervals can be established between the individual light pulses emitted by the optical transmitters S1, S2, S3, during which none of the optical transmitters S1, S2, S3 emits a light pulse. Instead, further test cycles for the sensor arrangement 10 can be performed during these intervals, if so desired.

By storing reference values for the relative positions of the position-proportional reception values of the individual optical transmitter/receiver pairs 1, 2, 3 the security and functioning of the sensor arrangement 10 is increased, since impurities or dirt in the optical transmitters S1, S2, S3 or optical receivers E1, E2, E3 can be identified. In particular, the failure of an optical transmitter S1, S2, S3 or optical receiver E1, E2, E3 can be identified. In addition, displacements of the optical transmitters S1, S2, S3 or optical receivers E1, E2, E3 within the sensor arrangement 10 can be identified and corrected.

FIG. 2 provides a schematic depiction of the sensor arrangement 10 of FIG. 1. Here identical components have identical reference numerals. However, in this embodiment the second optical transmitter/receiver pair 2 is not precisely aligned, so that the light ray L2a emitted by the second optical transmitter does not run parallel to the light rays L1a, L3a, but rather at an angle to them. This kind of incorrect positioning of the optical transmitter/receiver pairs 1, 2, 3 relative to each other can arise in the mounting process itself and may not be amenable to correction. But in this case too it is possible to determine the position-proportional reception values for each optical transmitter/receiver pair 1, 2, 3 and to determine and store the relative positions for the position-proportional reception values of adjacent optical transmitter/receiver pairs 1, 2, or 2, 3.

However, if the emitted light rays L1a, L2a, L3a do not all run parallel to each other, attention must be given to the fact the resolution of the optoelectronic sensor arrangement depends on the distance 'a' between the optoelectronic sensor arrangement 10 and the boundary surface F. The greater the distance 'a' between the sensor arrangement 10 and the boundary area F, the worse will be the resolution, since when a certain distance $a_{max}$ is exceeded an object can penetrate between the two diverging two light rays L2a, L3a without disrupting the light path between the sensor arrangement 10 and the boundary surface F. The size of the object G (which hopefully should be detected nonetheless by the sensor arrangement 10 in the protected area) thus determines the maximal distance $a_{max}$ between the sensor arrangement 10 and the boundary surface F. This can be established during mounting of the sensor arrangement 10 by having the object G registered by at least two light rays L1a, L2a, L3a for every distance 'a' from the optoelectronic sensor arrangement 10. During initial startup of the sensor arrangement 10 it is therefore advantageous to additionally establish the distance between the sensor arrangement 10 and the boundary surface F and to compare it with maximal permissible distance $a_{max}$, in order to guarantee the reliable functioning of the sensor arrangement 10.

LIST OF REFERENCE NUMERALS 10 optoelectronic sensor arrangement
S1 optical transmitter
S1a a lens system
S1b transmitter element
S2 optical transmitter
S2a lens system
S2b transmitter element
S3 optical transmitter
S3a lens system
S3b transmitter element
E1 optical receiver
E1a lens system
E1b receiver element
E2 optical receiver
E2a lens system
E2b receiver element
E3 optical receiver
E3a lens system
E3b receiver element
L1a emitted light ray
L2a emitted light ray
L3a emitted light ray
L1b reflected light ray
L2b reflected light ray
L3b reflected light ray
F boundary surface
a distance
$a_{max}$ distance
G object
1 optical transmitter/receiver pair
2 optical transmitter/receiver pair
3 optical transmitter/receiver pair

The invention claimed is:

1. Process for monitoring the functioning and/or adjustment of an optoelectronic sensor arrangement exhibiting at least two optical transmitters, to each of which an optical receiver is assigned, such that each optical receiver is designed as a laterally-resolving optical receiver and such that each of the optical transmitters and the corresponding optical receivers are so positioned relative to each other that light beams emitted from the optical transmitter can be detected by the corresponding optical receiver after being reflected by a boundary surface, which process involves the following steps:
   a) storing a maximum permissible distance between the optoelectronic sensor arrangement and the boundary surface, as determined by recording an object recorded at a plurality of defined distances from the optoelectronic sensor arrangement by at least two light beams,
   b) detecting current position-proportional reception values for each optical transmitter and corresponding optical receiver,
   c) determining current relative positions for reception values of any two adjacent optical transmitters, and
   d) comparing the current relative positions for the reception values with stored reference values for the relative positions.

2. Process according to claim 1, wherein the reference values for the relative positions are determined for the defined distance between the optical transmitters and the boundary surface in accordance with the following steps:

e) detecting the position-proportional reception values for each optical transmitter and the corresponding optical receivers for the defined distance between the optoelectronic sensor arrangement and the boundary surface, f) storing the detected receptions values as reference reception values, g) determining the relative positions for the reception values of any two adjacent optical transmitters, and h) storing the determined relative positions as reference values for the relative positions.

3. Process according to claim 1, wherein the reference values for the relative positions are determined for a plurality of different distances between the optoelectronic sensor arrangement and the boundary surface.

4. Process according to claim 1, wherein a size of the object determines the maximal permissible distance between the optoelectronic sensor arrangement and the boundary surface as determined and stored.

5. Process according to claim 1, wherein steps b) through d) are performed before each startup of the optoelectronic sensor arrangement and/or at regular intervals during operation.

6. Optoelectronic sensor arrangement, comprising:

at least two optical transmitters, each having an assigned optical receiver, such that assigned optical receivers are designed as laterally-resolving optical receivers and such that each of the optical transmitters and the corresponding optical receivers are so positioned relative to each other that a light beam emitted by the optical transmitter is detected by the corresponding optical receiver after being reflected by a boundary surface; and an evaluating and control unit configured to store a maximum permissible distance between the optoelectronic sensor arrangement and the boundary surface by:

recording an object recorded at a plurality of defined distances from the optoelectronic sensor arrangement by at least two of the light beams detecting the current position-proportional reception values for each optical transmitter and corresponding optical receiver, determining the current relative positions for the reception values of any two adjacent optical transmitters, and comparing the current relative positions for the reception values with reference values stored in the evaluating and control unit for the relative positions.

7. Optoelectronic sensor arrangement according to claim 6, wherein the optical transmitters emit a collimated light beam.

8. Optoelectronic sensor arrangement according to claim 6, wherein the optical transmitters emit light in the visible spectrum.

9. Optoelectronic sensor arrangement according to claim 6, wherein the optical receivers take the form of a segmented diode or a pixel array.

10. Optoelectronic sensor arrangement according to claim 6, wherein a control unit is provided which is suited to control the optical transmitters in such a way that said optical transmitters, one relative to another, emit a light beam in manner that is staggered over time.

* * * * *